(12) United States Patent
Adams et al.

(10) Patent No.: US 9,112,732 B2
(45) Date of Patent: Aug. 18, 2015

(54) SECURITY MEASURES FOR COUNTERING UNAUTHORIZED DECRYPTION

(75) Inventors: Neil Patrick Adams, Waterloo (CA); Eli Omen Jackson, Waterloo (CA); Shivangi Anantrupa Gandhi, Waterloo (CA); Christopher Lyle Bender, Waterloo (CA); Michael Kenneth Brown, Waterloo (CA); Alexandru-Radu Manea, Waterloo (CA); Lee Willis Manchur, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 834 days.

(21) Appl. No.: 12/464,279

(22) Filed: May 12, 2009

(65) Prior Publication Data

US 2009/0313705 A1    Dec. 17, 2009

Related U.S. Application Data

(60) Provisional application No. 61/052,630, filed on May 12, 2008.

(51) Int. Cl.
| | |
|---|---|
| *G06F 7/04* | (2006.01) |
| *H04L 9/08* | (2006.01) |
| *G06F 11/30* | (2006.01) |
| *H04L 12/58* | (2006.01) |
| *H04L 9/32* | (2006.01) |
| *H04L 29/06* | (2006.01) |

(52) U.S. Cl.
CPC .......... *H04L 12/5895* (2013.01); *H04L 9/0822* (2013.01); *H04L 51/38* (2013.01); *H04L 63/0435* (2013.01); *H04L 9/3247* (2013.01); *H04L 63/20* (2013.01); *H04L 2209/80* (2013.01); *H04L 2463/062* (2013.01); *H04L 2463/101* (2013.01)

(58) Field of Classification Search
CPC ..................................... G06F 7/04; H04L 9/08
USPC ................................ 370/408; 713/182; 726/3
See application file for complete search history.

(56) References Cited

U.S. PATENT DOCUMENTS

| | | | | |
|---|---|---|---|---|
| 5,073,767 A | * | 12/1991 | Holmes et al. .................. | 340/7.4 |
| 6,292,895 B1 | * | 9/2001 | Baltzley ......................... | 713/168 |

(Continued)

FOREIGN PATENT DOCUMENTS

| | | |
|---|---|---|
| CA | 2702780 | 11/2009 |
| DE | 101 27 360 | 12/2002 |

(Continued)

OTHER PUBLICATIONS

Extended European Search Report from corresponding European patent application No. 09745342.7, Dec. 17, 2011: 8 pages.

(Continued)

*Primary Examiner* — Arvin Eskandarnia
*Assistant Examiner* — Margishi Desai
(74) *Attorney, Agent, or Firm* — Integral Intellectual Property Inc.; Miriam Paton; Amy Scouten (57) ABSTRACT

After a predetermined limit for decryption attempts has been exceeded by a user attempting to decrypt an encrypted electronic message or attempting to decrypt a encrypted electronic certificate associated with an electronic message, access to the electronic message may be restricted.

25 Claims, 9 Drawing Sheets

(56) References Cited

U.S. PATENT DOCUMENTS

| | | | |
|---|---|---|---|
| 6,370,250 | B1 | 4/2002 | Stein |
| 6,608,637 | B1 | 8/2003 | Beaton et al. |
| 6,665,709 | B1 * | 12/2003 | Barron .......................... 709/217 |
| 6,959,194 | B2 | 10/2005 | Brouwer et al. |
| 7,196,807 | B2 | 3/2007 | Goldstone |
| 7,477,908 | B2 | 1/2009 | Klassen et al. |
| 7,640,427 | B2 * | 12/2009 | Callas et al. .................. 713/153 |
| 8,175,625 | B2 | 5/2012 | Klassen et al. |
| 8,463,305 | B2 | 6/2013 | Klassen et al. |
| 8,472,989 | B2 | 6/2013 | Klassen et al. |
| 2001/0014158 | A1 * | 8/2001 | Baltzley ........................ 380/281 |
| 2002/0007453 | A1 | 1/2002 | Nemovicher |
| 2002/0094089 | A1 | 7/2002 | Kamiya et al. |
| 2003/0070070 | A1 * | 4/2003 | Yeager et al. .................. 713/157 |
| 2004/0088369 | A1 * | 5/2004 | Yeager et al. .................. 709/217 |
| 2004/0137899 | A1 | 7/2004 | Hartmaier |
| 2004/0202327 | A1 * | 10/2004 | Little et al. .................... 380/270 |
| 2004/0205248 | A1 * | 10/2004 | Little et al. .................... 709/246 |
| 2005/0033963 | A1 * | 2/2005 | Ronchi et al. ................. 713/170 |
| 2005/0058094 | A1 | 3/2005 | Lazaridis et al. |
| 2005/0116840 | A1 * | 6/2005 | Simelius ........................ 341/22 |
| 2005/0235148 | A1 | 10/2005 | Scheidt et al. |
| 2006/0045110 | A1 * | 3/2006 | Miura et al. ................... 370/408 |
| 2006/0230459 | A1 | 10/2006 | Lam |
| 2006/0282847 | A1 * | 12/2006 | Gupte ............................ 725/25 |
| 2006/0294377 | A1 | 12/2006 | Ho et al. |
| 2006/0294391 | A1 * | 12/2006 | Wu ................................ 713/182 |
| 2007/0100913 | A1 * | 5/2007 | Sumner et al. ................ 707/204 |
| 2007/0124751 | A1 | 5/2007 | Le Fevre et al. |
| 2007/0143824 | A1 * | 6/2007 | Shahbazi ........................ 726/1 |
| 2008/0091955 | A1 * | 4/2008 | Leach ............................ 713/193 |
| 2009/0016357 | A1 * | 1/2009 | Blevins et al. ........... 370/395.53 |
| 2010/0031054 | A1 * | 2/2010 | Starr et al. .................... 713/189 |
| 2012/0220321 | A1 | 8/2012 | Klassen et al. |
| 2012/0220322 | A1 | 8/2012 | Klassen et al. |
| 2013/0252648 | A1 | 9/2013 | Klassen et al. |

FOREIGN PATENT DOCUMENTS

| | | | |
|---|---|---|---|
| EP | 1291748 | | 3/2003 |
| EP | 1291748 A2 | | 3/2003 |
| EP | 1670195 A1 * | 6/2006 | ............. H04L 12/58 |
| JP | 11-68828 | | 3/1999 |
| WO | 97/08870 | | 3/1997 |
| WO | 03/007184 A1 | | 1/2003 |
| WO | 2007071041 A1 | | 6/2007 |
| WO | 2009/137927 | | 11/2009 |

OTHER PUBLICATIONS

Gutmann, P.; "Password-based Encryption for CMS"; Request for Comments: 3211; Internet Engineering Task Force, IETF, Dec. 2001: 18 pages; XP015008990.

Office Action issued on Dec. 31, 2011 for corresponding Chinese Patent Application No. 200980100969.3; Chinese and English Translation; 17 pages.

United States Response for U.S. Appl. No. 13/898,593, dated Dec. 2, 2013.

Chinese Notice of Withdrawal for Chinese Patent Application Application No. 200980100969.3, dated Nov. 29, 2013.

International Preliminary Report. Application No. PCT/CA2009/000657. Dated: Nov. 25, 2010.

Written Opinion and International Search Report. Application No. PCT/CA2009/000657. Dated: Jul. 27, 2009.

Extended European Search Report. European Application No. 09745342.7. Dated: Oct. 17, 2011.

Response. European Application No. 09745342.7. Dated: May 3, 2012.

Co-pending U.S. Appl. No. 13/461,077, "Messaging Protocol/Service Switching Methods and Devices", Filed May 1, 2012.

Co-pending U.S. Patent Application No. 13/461,084, "Messaging Protocol/Service Switching Methods and Devices", Filed May 1, 2012.

Digital Cellular Telecommunications System (Phase 2+); Universal Mobile Telecommunications System (UMTS); Security Mechanisms for the (U)SIM application toolkit; Stage 2 (3GPP TS 23.048 version 5.7.0 Release 5); ETSI TS 123 048. ETSI Standards, European Telecommunications Standards Institute, Sophia-Antipo, FR, vol. 3-TE, No. V570, Jun. 2003 XP014007531.

Harjula, E., et al.; Plug-And-Play Application Platform; Towards Mobile Peer-to-Peer, MUM 2004, Oct. 27, 2004, pp. 63-69, XP002326464.

Office Action. U.S. Appl. No. 13/461,077. Dated: Aug. 6, 2012.

Office Action. U.S. Appl. No. 13/461,084. Dated: Sep. 17, 2012.

Chinese Office Action. Patent Application No. 200980100969.3. Dated: Oct. 9, 2012.

United States Notice of Allowance for Co-pending U.S. Appl. No. 13/461,084, dated Mar. 21, 2013.

United States Notice of Allowance for Co-pending U.S. Appl. No. 13/461,077, dated Feb. 25, 2013.

Chinese Office Action (English translation). Patent Application No. 200980100969.3. Dated: Oct. 9, 2012.

Amendment. Co-pending U.S. Appl. No. 13/461,077. Dated: Nov. 3, 2012.

Chinese Office Action for Chinese Patent Application No. 200980100969.3, dated Jul. 9, 2013.

Information Disclosure Statements and Notices of References Cited for U.S. Appl. No. 13/461,084.

Information Disclosure Statements for U.S. Appl. No. 13/898,593.

United States Non-Final Office Action for U.S. Appl. No. 13/898,593, dated Sep. 4, 2013.

Information Disclosure Statements and Notices of References Cited for U.S. Appl. No. 13/461,077.

Canadian Office Action for Canadian Patent Application No. 2,702,780, dated Jan. 8, 2013.

United States Response for Co-pending U.S. Appl. No. 13/461,084, dated Dec. 14, 2012.

Office Action. Canadian Patent Application No. 2,702,780. Dated: Jan. 21, 2014.

Notice of Allowance. Co-pending U.S. Appl. No. 13/898,593. Dated: March 31, 2014.

Corrected Notice of Allowance. Co-pending U.S. Appl. No. 13/898,593. Dated: Aug. 15, 2014.

Li, Third Office Action for CA2702780, Feb. 26, 2015.

* cited by examiner

SECURITY MEASURES FOR COUNTERING UNAUTHORIZED DECRYPTION

CROSS REFERENCE TO RELATED APPLICATION

The present application claims priority from U.S. provisional Patent Application No. 61/052,630, filed May 12, 2008, which is incorporated herein by reference in its entirety.

FIELD OF THE INVENTION

The present application relates generally to decryption of electronic messages and certificates and, more specifically, to security measures for countering unauthorized decryption.

BACKGROUND OF THE INVENTION

Security for electronic messages can be considered to relate to two categories: a privacy category; and an authentication category. For privacy, a sending party may encrypt a message with a key or a passphrase. To decrypt the message, the receiver must use a corresponding key or the passphrase. Such a scheme works best when only those who the sending party trusts have access to the corresponding key or the passphrase. For authentication, the sending party may use a key to generate a signature for a message and send the signature in conjunction with the message. The receiver can use a corresponding key to decrypt the received signature and compare the decrypted signature to a further signature generated using the received message. A match between the decrypted received signature and the further signature can provide the receiving party with confidence that the message originated with the specific sending party.

BRIEF DESCRIPTION OF THE DRAWINGS

Reference will now be made to the drawings, which show, by way of example, embodiments and in which.

DETAILED DESCRIPTION OF THE EMBODIMENTS

After a predetermined limit on attempts at providing a correct passphrase has been exceeded by a user attempting to decrypt an encrypted electronic message, access to the encrypted electronic message may be restricted.

In accordance with an aspect of the present application there is provided a method of managing a plurality of electronic messages. The method includes receiving an electronic message and a session key, the electronic message encrypted with the session key, the session key encrypted with a passphrase, receiving a request to access the electronic message, receiving a candidate passphrase and arranging an attempt to decrypt the session key with the passphrase. The method further includes determining that the attempt has resulted in a failure, incrementing a count of failed decryption attempts, determining that the count of failed decryption attempts exceeds a predetermined limit for decryption attempts and restricting access to the electronic message. In other aspects of the present application, a mobile communication device is provided for carrying out this method and a computer readable medium is provided for adapting a processor to carry out this method.

In accordance with another aspect of the present application there is provided a method of method of managing a plurality of electronic messages. The method including receiving an electronic message, an electronic certificate and a session key, the electronic certificate encrypted with the session key, the session key encrypted with a passphrase. The method further includes receiving a request to access the electronic certificate, receiving a candidate passphrase, arranging an attempt to decrypt the session key with the candidate passphrase, determining that the attempt has resulted in a failure, incrementing a count of failed decryption attempts, determining that the count of failed decryption attempts exceeds a predetermined limit for decryption attempts and restricting access to the electronic message.

Other aspects and features of the present invention will become apparent to those of ordinary skill in the art upon review of the following description of specific embodiments of the invention in conjunction with the accompanying figures.

Figure 1:
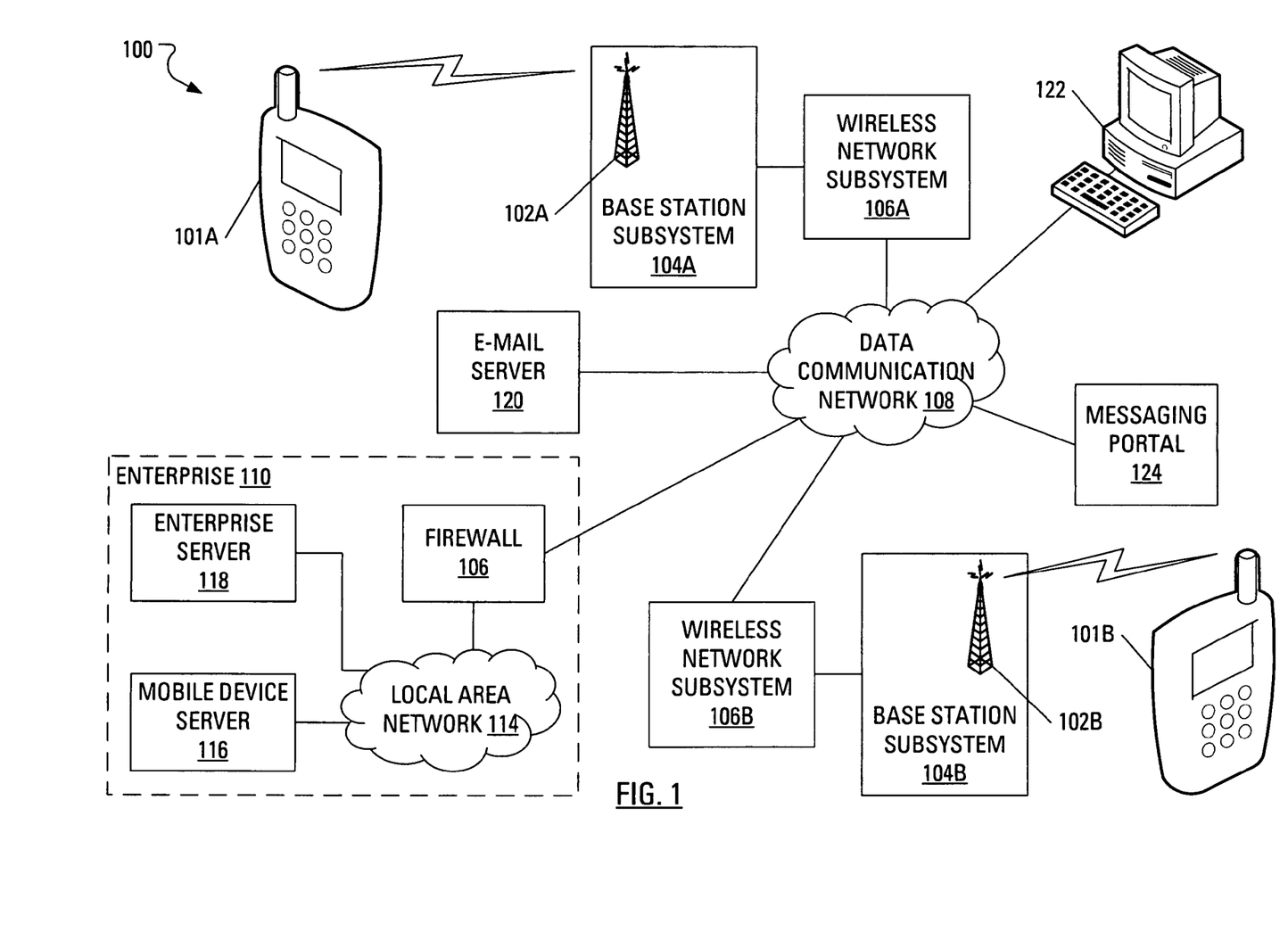
FIG. 1 illustrates elements of an exemplary network environment for electronic messaging, where the exemplary network environment includes a mobile communication device.

FIG. 1 illustrates elements of an exemplary network environment 100 for electronic messaging. The elements of the exemplary network environment 100 include multiple wireless carrier networks and a data communication network 108, which may be considered to represent at least one wide area network, such as the present day Internet and successors, as well as, potentially, multiple local area networks. A first base station antenna 102A, with which a first wireless mobile communication device 101A may communicate wirelessly, is provided as part of a first base station subsystem 104A.

The first base station subsystem 104A connects to a first wireless network subsystem 106A. In an exemplary Global System for Mobile communications (GSM) implementation, the first wireless network subsystem 106A includes, among other components, a Mobile Services Switching Center, a Home Location Register, a Visitor Location Register, a relay and a Short Messaging Service Center (SMSC). As illustrated in FIG. 1, the first wireless network subsystem 106A is connected to the data communication network 108.

Also connected to the data communication network 108 is a second wireless network subsystem 106B. Similar to the first wireless network subsystem 106A, the second wireless network subsystem 106B may include a Mobile Services Switching Center, a Home Location Register, a Visitor Location Register, a relay and an SMSC. The second wireless network subsystem 106B connects to a second base station subsystem 104B with a second base station antenna 102B. The second base station antenna 102B may allow the second base station subsystem 104B to communicate wirelessly with a second mobile device 101B.

The first mobile device 101A may be associated with an enterprise 110 connected to the data communication network 108. The enterprise 110 may, for instance, include a firewall or proxy server 112 connecting to the data communication network 108 and to a local area network (LAN) 114. The LAN 114 may allow communication between a mobile device server 116 and an enterprise server 118 and between the servers 116, 118 and other network entities (not shown) through the data communication network 108.

Also connected to the data communication network 108 may be an e-mail server 120 and a desktop computer 122, which may be associated with a user having an account on the e-mail server 120. Also connected to the data communication network 108 may be a messaging portal 124.

In operation, a user of the desktop computer 122 (or the second mobile device 101B) may compose an e-mail message for sending to a user of the first mobile device 101A. As part of the e-mail message composition process, the user may select an encryption method to be applied to the message before the message is transmitted. Example encryption methods include Pretty Good Privacy (PGP) and Secure/Multipurpose Internet Mail Extensions (S/MIME).

MIME is an Internet standard that extends the format of e-mail to support: text in character sets other than US-ASCII; non-text attachments; multi-part message bodies; and header information in non-ASCII character sets. S/MIME is a standard for public key encryption and signing of e-mail messages encapsulated in MIME.

Figure 2:
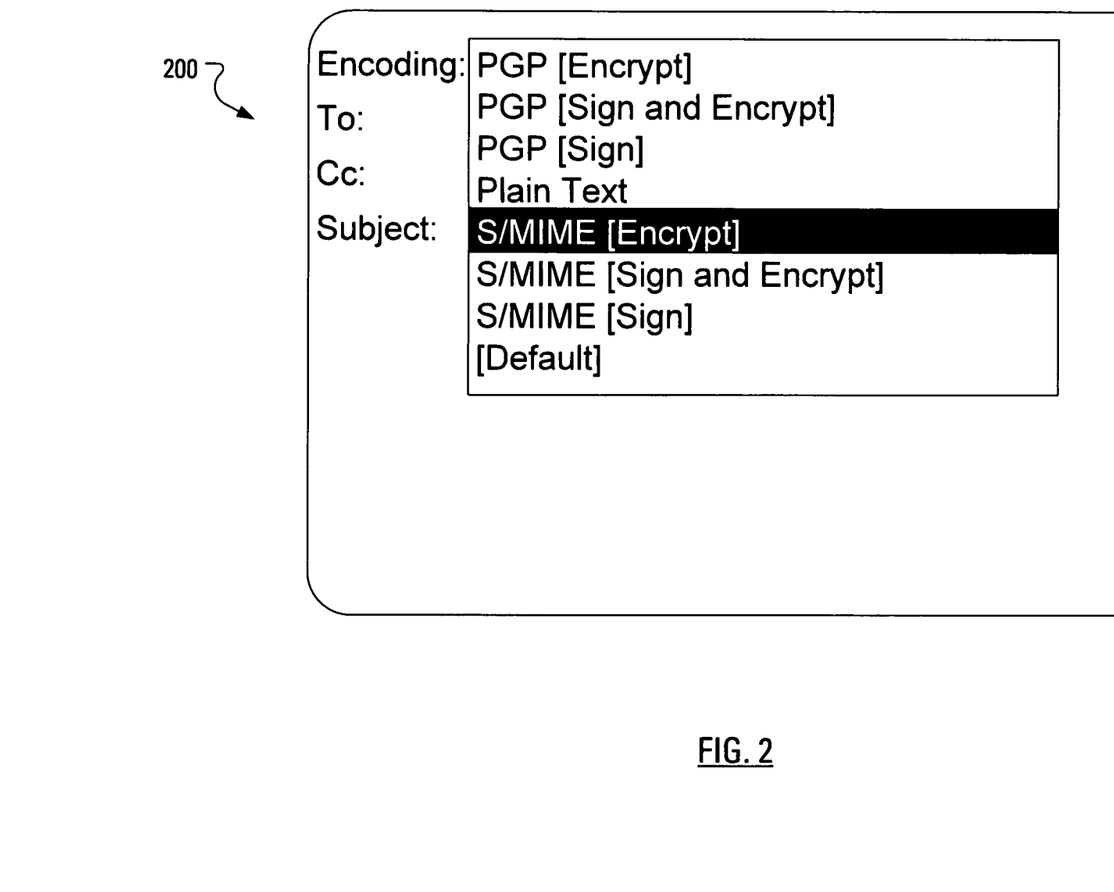
FIG. 2 illustrates a message composition application user interface screen.

As illustrated in a message composition application user interface screen 200 of FIG. 2, selection of whether to employ an encryption method and whether to sign, or encrypt or both is an option to be specified just as the destination address and subject of the message are options to be specified.

Figure 3:
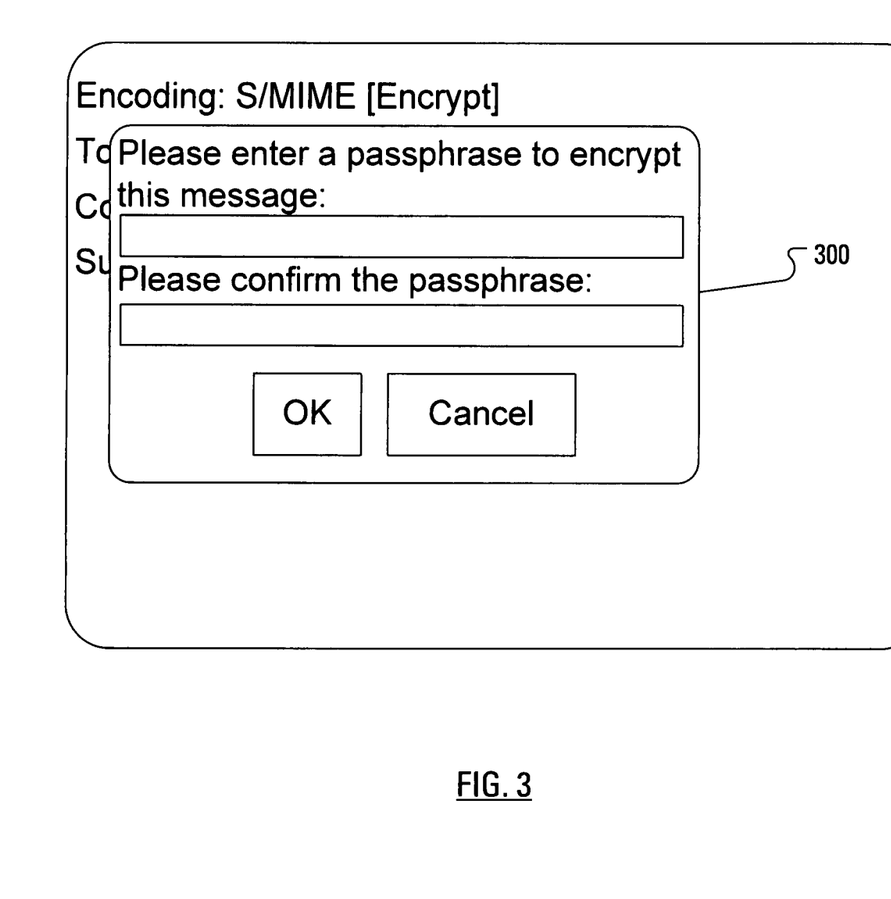
FIG. 3 illustrates a passphrase specification dialog.

A message encryption algorithm (implementing, for example, the PGP encryption method or the S/MIME encryption method) receives, as input, the message and a passphrase, and produces, as output, an encrypted version of the message. Accordingly, when the user indicates, through interaction with the user interface, that the message is ready to be transmitted, message encryption algorithm method receives, as input, the ready-to-be-transmitted message. Responsively, the message encryption algorithm prompts the user for a passphrase (see FIG. 3), for example, with a passphrase specification dialog 300. Once the user has entered a passphrase twice (for confirmation), the message encryption algorithm can encrypt the message and allow the message composition application to arrange transmission of the encrypted message via the data communication network 108 to the specified destination address, for example, a destination address associated with the user of the first mobile device 101A.

In one example of a message encryption algorithm, responsive to receiving the passphrase, the device on which the ready-to-be-transmitted message has been composed generates a session key and encrypts the ready-to-be-transmitted message with the session key. The device further encrypts the session key with the received passphrase. The device transmits the encrypted session key along with the encrypted message.

Assuming that the e-mail account of the user of the first mobile device 101A is maintained at the enterprise server 118 of the enterprise 110, the encrypted message may be received from the data communication network 108 at the enterprise server 118. The mobile device server 116, responsive to recognizing that a new message has been received, at the enterprise server 118, for the user of the first mobile device 101A, may obtain the encrypted message from the enterprise server 118 and transmit the encrypted message to the first mobile device 101A via the data communications network 108, the first wireless network subsystem 106A, first base station subsystem 104A and the first base station antenna 102A.

The user of the first mobile device 101A may receive an indication that the encrypted message has been received by the first mobile device 101A. The user may subsequently attempt to open the encrypted message for reading.

Figure 4:
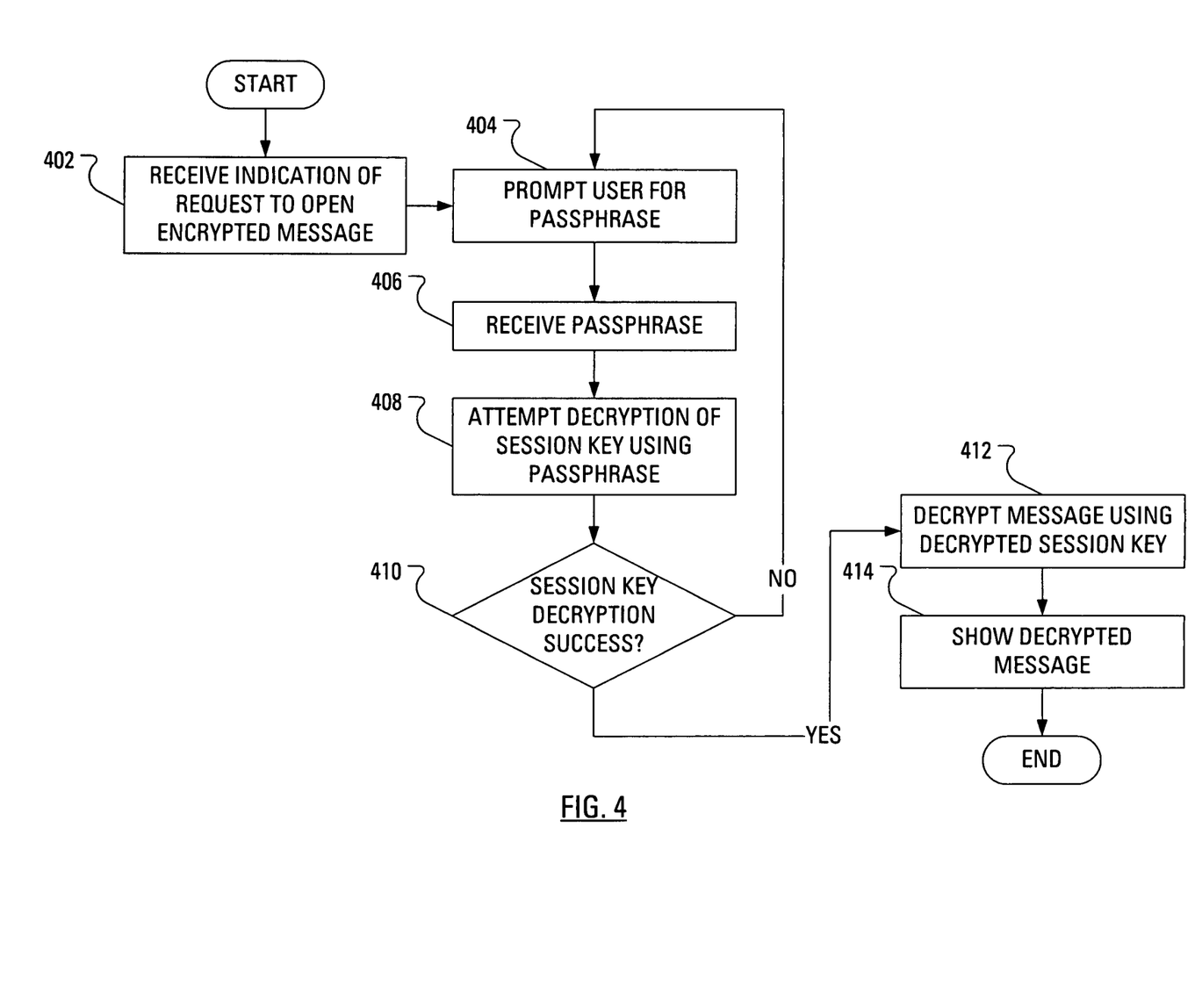
FIG. 4 illustrates steps in an example known method of managing a plurality of messages.
Figure 5:
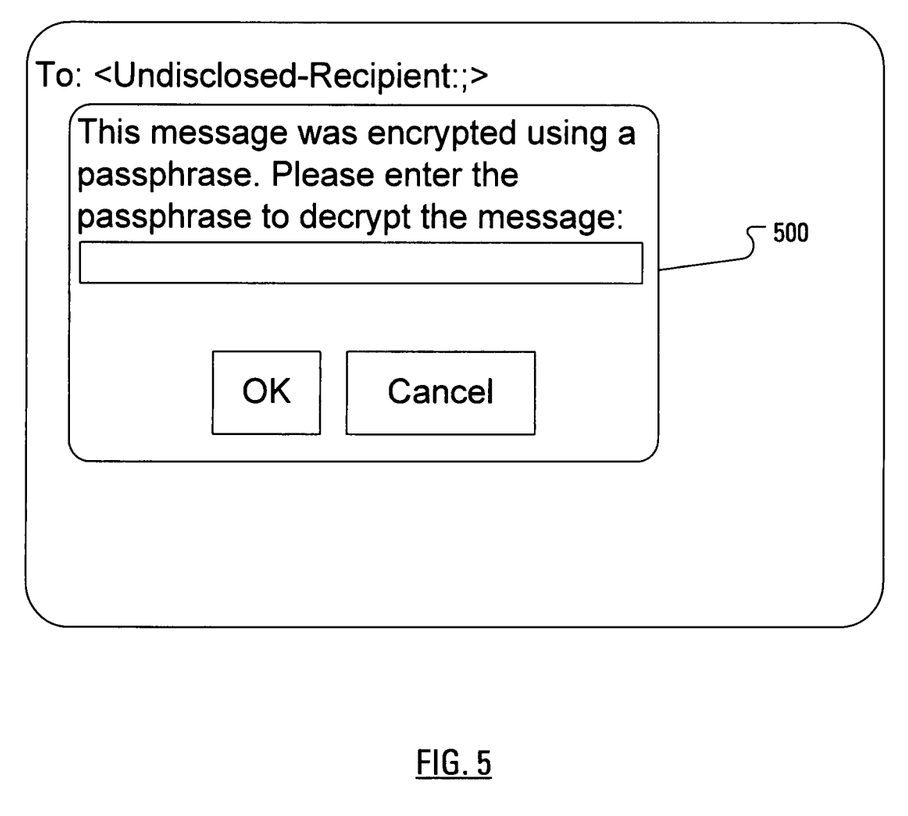
FIG. 5 illustrates a passphrase request dialog.

FIG. 4 illustrates steps in an example method of managing a plurality of messages, the method carried out by a message management application executed on the first mobile device 101A. Responsive to receiving (step 402) an indication that the user is requesting to open the encrypted message, the message management application may prompt (step 404) the user for the passphrase that was supplied with the instruction to encrypt the message. The prompt may, for instance, be accomplished in the form of a passphrase request dialog 500 (see FIG. 5). Responsive to receiving (step 406) a candidate passphrase from the user, the message management application may attempt to decrypt (step 408), using the candidate passphrase, the encrypted session key received in association with the encrypted message. Such an attempt may involve passing the encrypted session key and the candidate passphrase to a decryption algorithm and receiving, in return, either an indication of successful decryption and a decrypted session key or an indication of a failure to decrypt the encrypted session key. The message management application may subsequently determine (step 410) whether an indication of successful decryption has been received.

Upon attempting to decrypt (step 408) the encrypted session key using the candidate passphrase, the result should be a valid session key. Successful decryption may be assessed though validation of the session key. Validation of the session key may comprise, for example, determining whether the result has a predetermined format. The predetermined format for the session key may have fields in specific positions within the session key that have the same contents for every session key. One example of such a field is a key length field.

Under ideal conditions, the sender of the message (e.g., the user of the desktop computer 122, whose electronic mail address may be identified in a header associated with the encrypted message) has informed the intended receiver of the message (e.g., the user of the first mobile device 101A) of the passphrase. Accordingly, responsive to the prompt, the user of the first mobile device 101A may enter the correct passphrase. Where the message management application determines (step 410) that the decryption has been successful, the message management application may use the decrypted session key to decrypt (step 412) the encrypted message. Upon decrypting (step 412) the message, the message management application may show (step 414) the decrypted message to the user.

Unfortunately, conditions are not always ideal. It may be that a person not authorized to read the message has obtained the first mobile device 101A. The unauthorized person may attempt to open the encrypted message for reading. Without fore-knowledge of the passphrase, it very likely that the first candidate passphrase received (step 406) from the unauthorized person will lead to a failure to decrypt the session key. Where the message management application determines (step 410) that there has been a failure to decrypt (step 408) the encrypted session key, the message management application may, once again, prompt (step 404) the unauthorized person for a passphrase to use to decrypt the encrypted message.

Consequently, the message management application repeats the candidate passphrase receiving (step 406), decryption attempting (step 408) and success determining (step 410) steps. Again, it is likely that the second candidate passphrase received (step 406) from the unauthorized person will lead to a failure to decrypt the session key. Where the message management application determines that there has been a failure to decrypt the encrypted session key, the message management application may, once again, prompt (step 404) the unauthorized person for a passphrase to use to decrypt the encrypted message.

Such a "trial and error" approach to decrypting the encrypted message by the unauthorized person may be called a "brute force attack". Given enough time, the unauthorized person may repeatedly provide candidate passphrases until the unauthorized person provides the passphrase that decrypts the encrypted message.

In overview, the message management application may limit the number of attempts at providing a correct passphrase. Once the limit on attempts has been reached, the message management application may take action to further restrict access to the encrypted message.

Figure 6:
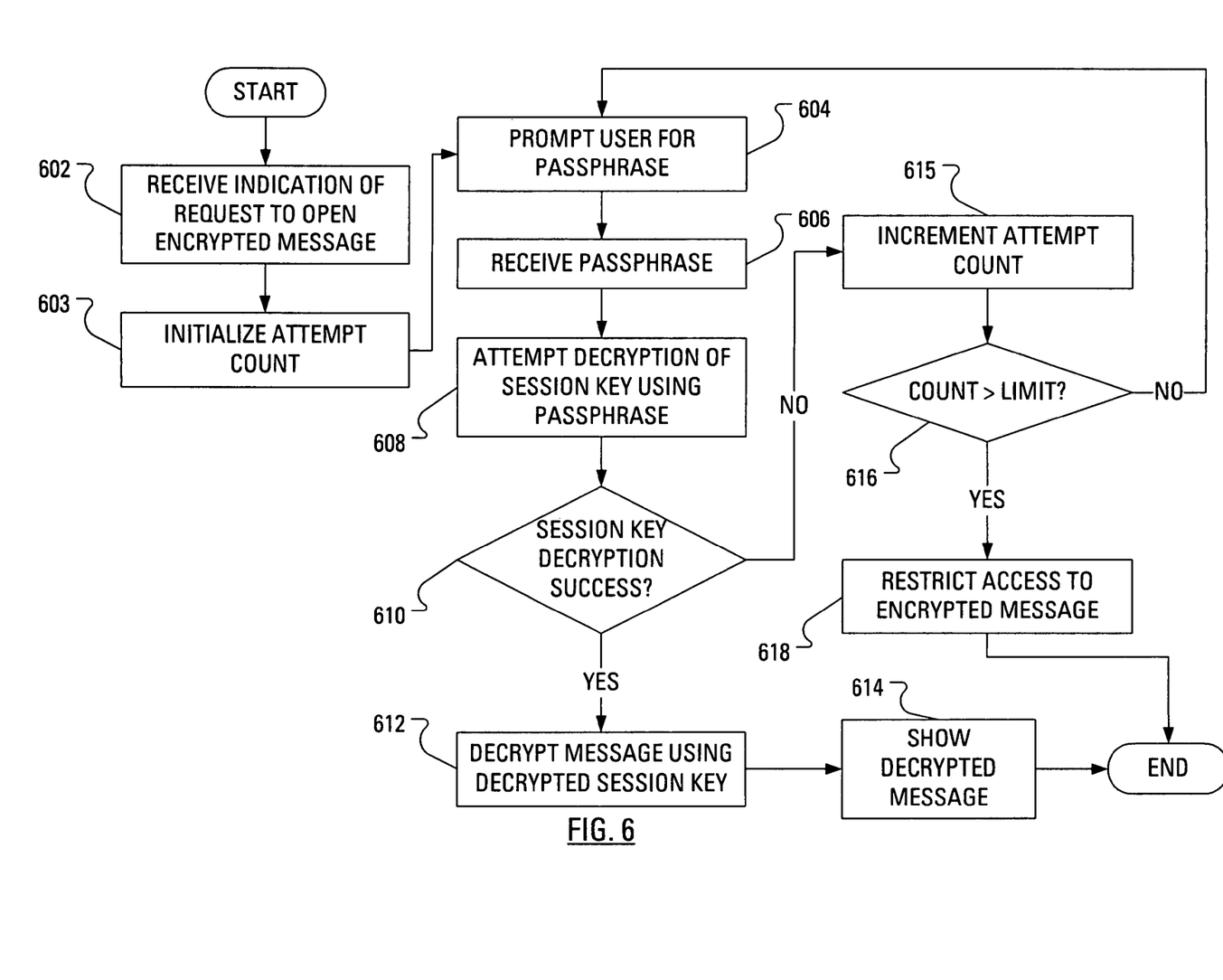
FIG. 6 illustrates steps in an example novel method carried out by a message management application in accordance with an embodiment.

FIG. 6 illustrates steps in an example novel method carried out by a message management application executed on the first mobile device 101A. Responsive to receiving (step 602) an indication that the user is requesting to open the encrypted message, the message management application may initialize (e.g., set to zero) a count of failed decryption attempts (step 603) associated with the encrypted message. The message management application may then prompt (step 604) the user for the passphrase that was used during the encryption of the message. The prompt may, for instance, be accomplished in the form of the passphrase request dialog 500 (see FIG. 5). Responsive to receiving (step 606) a candidate passphrase from the user, the message management application may attempt to decrypt (step 608) the encrypted session key using the candidate passphrase. Such an attempt may involve passing the encrypted session key and the candidate passphrase to a decryption algorithm and receiving, in return, either an indication of successful decryption and a decrypted message or an indication of a failure to decrypt the encrypted session key. The message management application may subsequently determine (step 610) whether the session key decryption has been successful.

As discussed with respect to the method of FIG. 4, upon attempting to decrypt (step 608) the encrypted session key using the candidate passphrase, the result should be a valid session key. Successful decryption may be assessed though validation of the session key. Validation of the session key may comprise, for example, determining whether the result has a predetermined format. The predetermined format for the session key may have fields in specific positions within the session key that have the same contents for every session key. One example of such a field is a key length field.

Where the message management application determines (step 610) that the decryption has been successful, the message management application may use the decrypted session key to decrypt (step 612) the encrypted message. Upon decrypting (step 612) the message, the message management application may show (step 614) the decrypted message to the user.

As stated above, conditions are not always ideal. It may be that a person not authorized to read the message has obtained the first mobile device 101A. The unauthorized person may attempt to open the encrypted message for reading. Without fore-knowledge of the passphrase, it very likely that the first candidate passphrase received (step 606) from the unauthorized person will lead to a failed attempt (step 608) to decrypt the session key. Where the message management application determines (step 610) that there has been a failure to decrypt the encrypted session key, the message management application may increment (step 615) the count of failed decryption attempts. The message management application may then determine (step 616) whether the count of failed decryption attempts is greater than a predetermined limit for decryption attempts.

The predetermined limit for decryption attempts may be established as part of an enterprise-wide Information Technology Policy or may be set by the user of the first mobile device 101A using a message management application options user interface.

Figure 7:
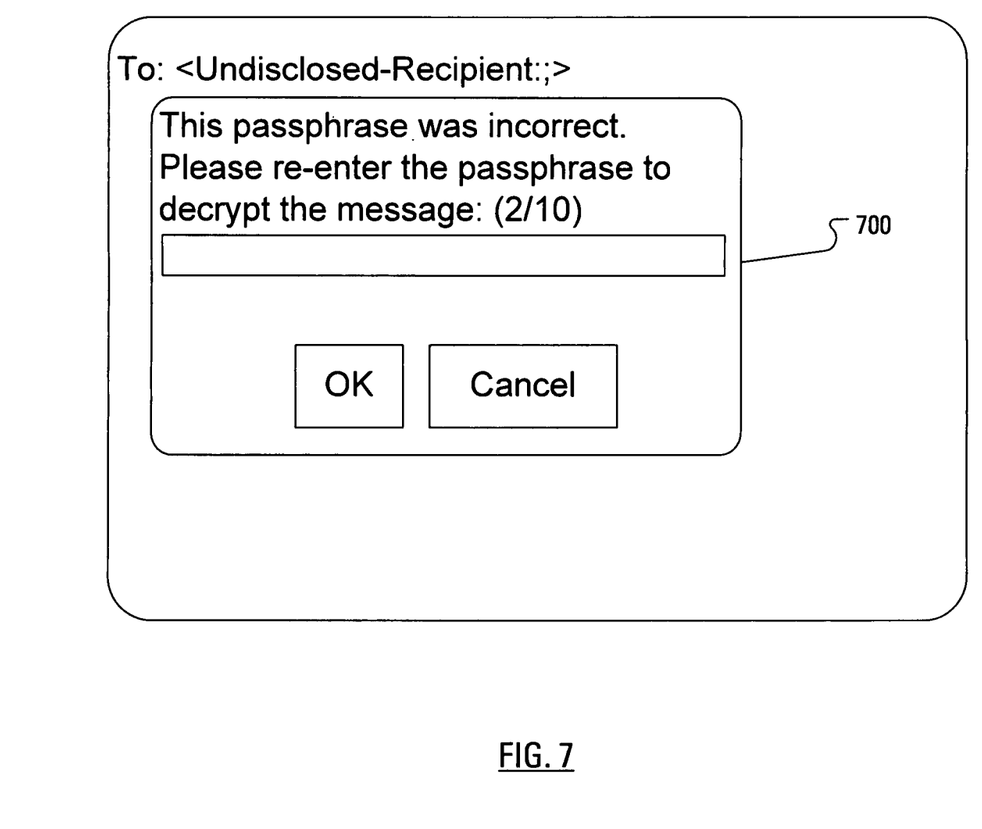
FIG. 7 illustrates subsequent-to-first passphrase request dialog.

If the message management application determines (step 616) that the count of failed decryption attempts is no greater than the predetermined limit for decryption attempts, the message management application may then prompt (step 604) the user for the passphrase that was used during encryption of the message. The prompt for a decryption attempt subsequent to the first decryption attempt may indicate the number of the current decryption attempt and may further indicate the predetermined limit on decryption attempts. See, for example, a subsequent-to-first passphrase request dialog 700, illustrated in FIG. 7. Notably, the subsequent-to-first passphrase request dialog 700 indicates that the number of the current decryption attempt is 2 and the predetermined limit on decryption attempts is 10.

Figure 8:
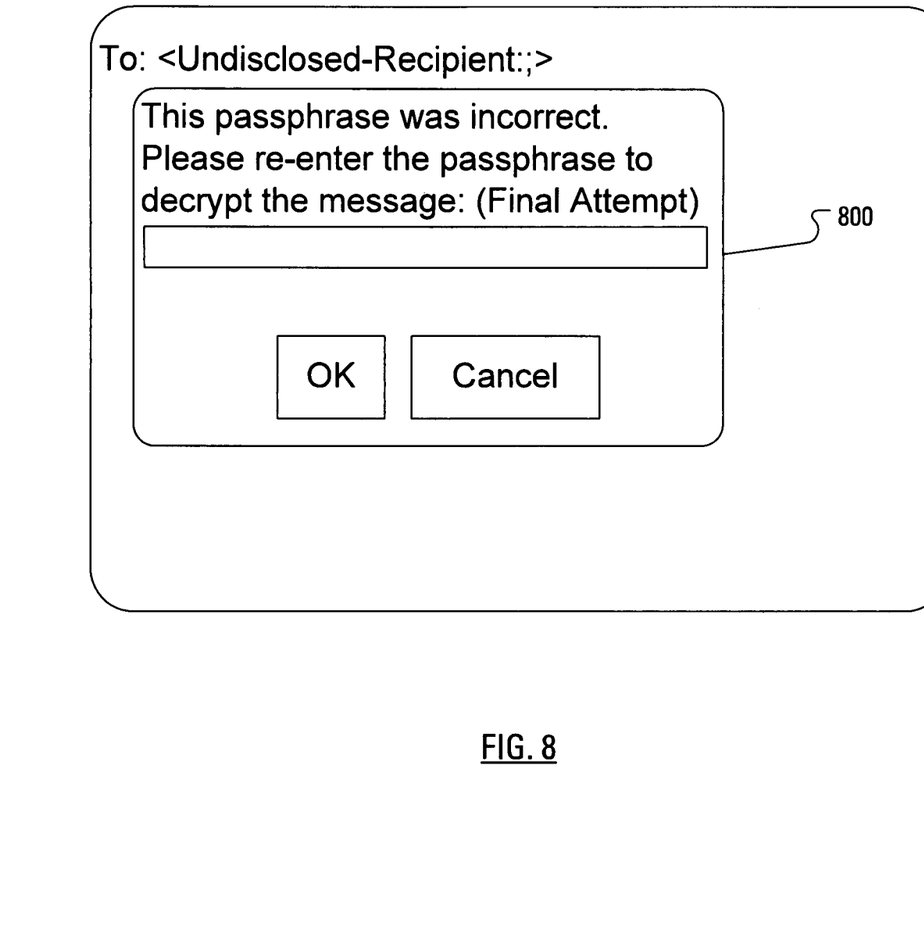
FIG. 8 illustrates a final passphrase request dialog.

The message management application then repeats the candidate passphrase receiving (step 606), decryption attempting (step 608) and success determining (step 610) steps. Again, it is likely that the second candidate passphrase received (step 606) from the unauthorized person will lead to a failure to decrypt the session key. If the message management application determines (step 610) that there has been a failure to decrypt the encrypted session key, the message management application may, once again, increment (step 615) the count of failed decryption attempts. The message management application may then determine (step 616) whether the count of failed decryption attempts is greater than a predetermined limit for decryption attempts.

Where the message management application determines (step 610), for the ninth time, that there has been a failure to decrypt the encrypted message, the message management application may increment (step 615) the count of failed decryption attempts to 10. The message management application may then determine (step 616) whether the count of failed decryption attempts is greater than the predetermined limit for decryption attempts.

Where the predetermined limit for decryption attempts is 10, the message management application will determine (step 616) that the count of failed decryption attempts is not greater than the predetermined limit for decryption attempts (indeed, the values are equal), the message management application may then prompt (step 604) the user for the passphrase that was used during encryption of the message. The prompt for a final decryption attempt may indicate that the current decryption attempt is the final decryption attempt. See, for example, a final passphrase request dialog 800, illustrated in FIG. 8. Notably, the final passphrase request dialog 800 indicates that the current decryption attempt is the final decryption attempt.

The message management application then repeats the candidate passphrase receiving (step 606), decryption attempting (step 608) and success determining (step 610) steps. Again, it is likely that the final candidate passphrase received (step 606) from the unauthorized person will lead to a failure to decrypt the message.

Where the message management application determines (step 610), for the tenth time, that there has been a failure to decrypt the encrypted session key, the message management application may increment (step 615) the count of failed decryption attempts to 11. The message management application may then determine (step 616) that the count of failed decryption attempts is greater than the predetermined limit for decryption attempts.

Upon determining (step 616) that the count of failed decryption attempts is greater than the predetermined limit for decryption attempts, the message management application may then restrict access to the encrypted message (step 618). Indeed, exceeding the limit for decryption attempts may indicate that the first mobile device 101A is under attack. Accordingly, even beyond restricting access to the encrypted message, the message management application may initiate steps to restrict access to some or all of the data and applications on the first mobile device 101A.

It is considered that there is a wide variety of ways in which access to the encrypted message may be restricted. For example, the message management application may erase the encrypted message.

A potential problem with erasing the encrypted message is recognized in that the user may not have contact information for the sender of the encrypted message. The user may not be able to contact the sender to request that the message be resent. One solution to this may involve the message management application sending a notification to the sender of the message, where the notification indicates that the passphrase was not entered correctly. As mentioned hereinbefore, the electronic mail address of the sender may be identified in a header associated with the encrypted message. Accordingly, the encrypted message should not be erased until after the message management application has recorded the electronic mail address of the sender.

Furthermore, the message management application may erase all messages that are stored locally on the first mobile device 101A and are from the sender of the encrypted message. Expansively, the message management application may erase all messages that are stored locally on the first mobile device 101A and are related to the encrypted message. For instance, the messages related to the encrypted message may be identified by sharing subject line text and may originate from people other than the sender and the user of the first mobile device 101A. In an extreme case, access to the encrypted message may be restricted (step 618) by erasing all of the messages on the first mobile device 101A.

More subtle ways in which access to the encrypted message may be restricted (step 618) may involve prohibiting forwarding of the encrypted message and/or prohibiting replying to the encrypted message. Additionally, restricting (step 618) access to the encrypted message may involve disallowing copy and paste operations, thereby preventing the attacker from copying the encrypted message and emailing the encrypted message to himself/herself to perform a brute force attack at a later time. Further alternatively, the message management application may disable channels (wired or wireless) by which the encrypted message may be copied from the first mobile device 101A or may prohibit all actions whatsoever.

Responsive to determining (step 616) that the count of failed decryption attempts is greater than the predetermined limit for decryption attempts, the message management application may restrict (step 618) access to the encrypted message by locking the first mobile device 101A. To unlock the device, the attacker would then be required to provide a device unlocking passphrase. There may be consequences to failing to provide a correct device unlocking passphrase after a predetermined limit on the number of device unlock attempts. For instance, responsive to exceeding the predetermined limit on the number of device unlock attempts, the first mobile device 101A may be arranged to erase all data and applications from itself.

However, should the person successfully unlock the first mobile device 101A, it may be considered that the device owner has been authenticated even if the excessive number of attempts to decrypt the encrypted message may have suggested that an attack was underway. Accordingly, the count of failed decryption attempts may be reset to zero.

In one embodiment, the count of failed decryption attempts may be reset to zero a predetermined duration after the predetermined limit for decryption attempts has been exceeded. While an attacker could wait the duration and then continue with the attack, such an approach may be combined with another option to slow down an attack.

In an extreme case, responsive to determining (step 616) that the count of failed decryption attempts is greater than the predetermined limit for decryption attempts, the message management application may restrict access to the encrypted message (step 618) by erasing all data and applications from the first mobile device 101A.

As will be clear to a person of ordinary skill in the art, although aspects of the present disclosure have concentrated on the desktop computer 122 being the encrypted message originating device and the first mobile device 101A being the encrypted message receiving device, the method of FIG. 6 is equally applicable when a mobile device, such as the second mobile device 101B, is the encrypted message originating device. Similarly, the method of FIG. 6 is equally applicable when the desktop computer 122 is the encrypted message receiving device.

Furthermore, while the foregoing has discussed an e-mail message as the encrypted message, it should be understood that the encryption could equally be applied to other types of electronic messages, such as, for example, instant messaging messages, Short Messaging Service (SMS) messages, Multimedia Messaging Service (MMS) messages and proprietary, device manufacturer-specific device-to-device messages. The latter type of electronic messages may take the form of peer-to-peer messages. Example peer-to-peer messages are sometimes known as PIN-to-PIN messages or, simply, as "PIN messages". The term "PIN", as used here, is an acronym for Product Identification Number. As used in this context, PIN generally refers to a number that uniquely identifies the mobile device and a PIN message generally refers to a message addressed to one or more mobile devices, where the mobile devices are each identified by a distinct PIN.

In addition to countering unauthorized decryption of electronic messages, elements of the methods discussed above may be used in a situation wherein an electronic message is received by the first mobile device 101A accompanied by encrypted electronic certificate. Without regard to whether the electronic message is encrypted, an attacker may concentrate decryption efforts on the encrypted electronic certificate. Indeed, even if the electronic message is not encrypted, if an attacker is allowed to determine a passphrase used during encryption of a certificate accompanying the electronic message, the attacker may discover that the same passphrase is used for other messages stored on the first mobile device 101A. Accordingly, it is in the interest of overall security of the first mobile device 101A to restrict access to the message associated with an encrypted electronic certificate upon determining that the count of failed decryption attempts is greater than the predetermined limit for decryption attempts. The manner of restricting access to the message may, for example, be any of the manners discussed hereinbefore.

Figure 9:
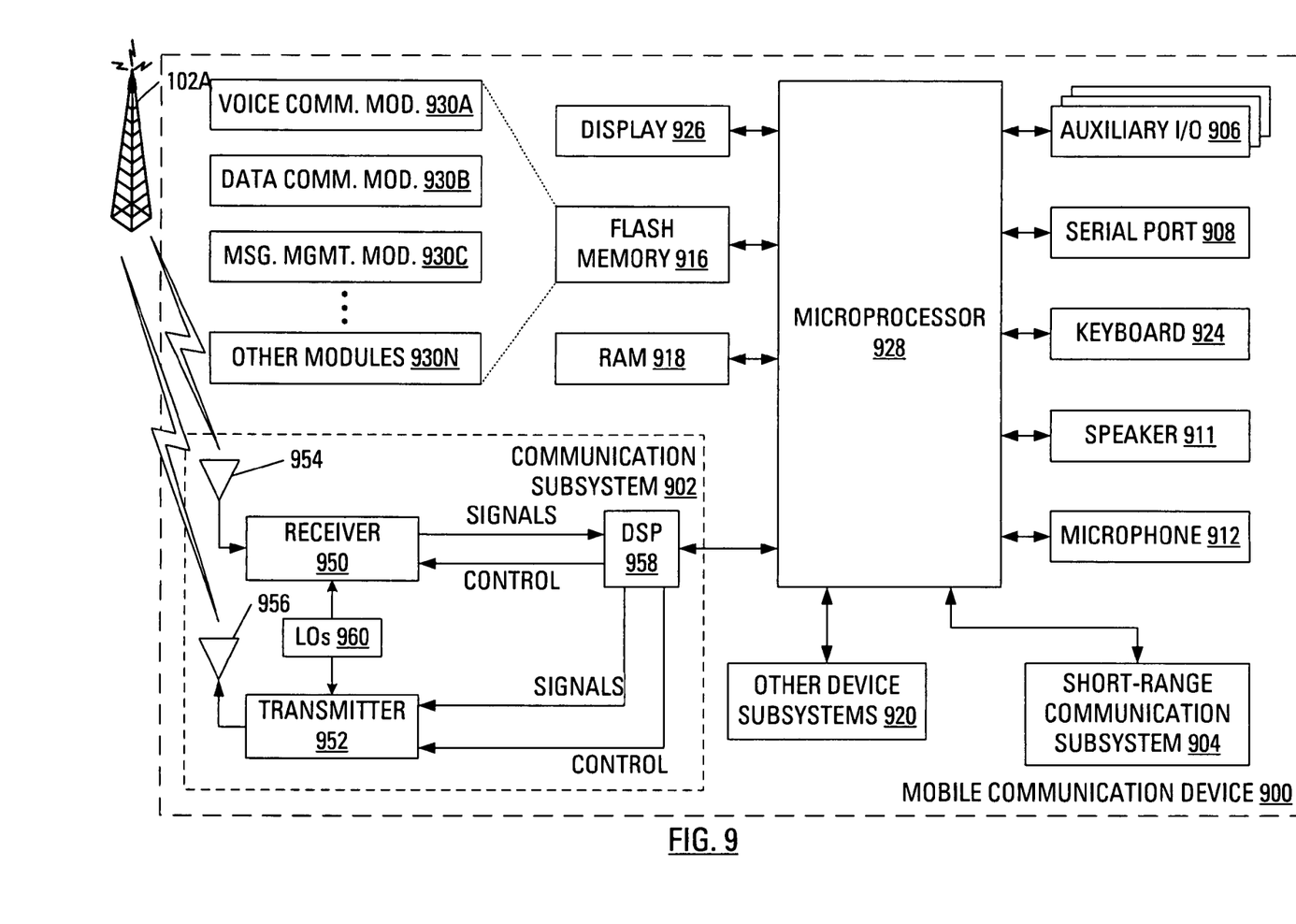
FIG. 9 schematically illustrates the mobile communication device of FIG. 1.

FIG. 9 illustrates the mobile communication device 101A as an example of the device that may carry out the method of FIG. 6. The mobile communication device 101A includes a housing, an input device (e.g., a keyboard 924 having a plurality of keys) and an output device (e.g., a display 926), which may be a full graphic, or full color, Liquid Crystal Display (LCD). In some embodiments, the display 926 may comprise a touchscreen display. In such embodiments, the keyboard 924 may comprise a virtual keyboard. Other types of output devices may alternatively be utilized. A processing device (a microprocessor 928) is shown schematically in FIG. 9 as coupled between the keyboard 924 and the display 926. The microprocessor 928 controls the operation of the display 926, as well as the overall operation of the mobile communication device 101A, in part, responsive to actuation of the keys on the keyboard 924 by a user.

The housing may be elongated vertically, or may take on other sizes and shapes (including clamshell housing structures). Where the keyboard 924 includes keys that are associated with at least one alphabetic character and at least one numeric character, the keyboard 924 may include a mode selection key, or other hardware or software, for switching between alphabetic entry and numeric entry.

In addition to the microprocessor 928, other parts of the mobile communication device 101A are shown schematically in FIG. 9. These may include a communications subsystem 902, a short-range communications subsystem 904, the keyboard 924 and the display 926. The mobile communication device 106 may further include other input/output devices, such as a set of auxiliary I/O devices 906, a serial port 908, a speaker 910 and a microphone 912. The mobile communication device 106 may further include memory devices including a flash memory 916 and a Random Access Memory (RAM) 918 and various other device subsystems 920. The mobile communication device 101A may comprise a two-way radio frequency (RF) communication device having voice and data communication capabilities. In addition, the mobile communication device 101A may have the capability to communicate with other computer systems via the Internet.

Operating system software executed by the microprocessor 928 may be stored in a computer readable medium, such as the flash memory 916, but may be stored in other types of memory devices, such as a read only memory (ROM) or similar storage element. In addition, system software, specific device applications, or parts thereof, may be temporarily loaded into a volatile store, such as the RAM 918. Communication signals received by the mobile device may also be stored to the RAM 918.

The microprocessor 928, in addition to its operating system functions, enables execution of software applications on the mobile communication device 101A. A predetermined set of software applications that control basic device operations, such as a voice communications module 930A and a data communications module 930B, may be installed on the mobile communication device 101A during manufacture. A message management module 930C may also be installed on the mobile communication device 101A during manufacture, to implement aspects of the present disclosure. As well, additional software modules, illustrated as another software module 930N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network represented by the first base station antenna 102A. The data items managed by the PIM application may be seamlessly integrated, synchronized and updated via the wireless carrier network 102A with the device user's corresponding data items stored or associated with a host computer system.

Communication functions, including data and voice communications, are performed through the communication subsystem 902 and, possibly, through the short-range communications subsystem 904. The communication subsystem 902 includes a receiver 950, a transmitter 952 and one or more antennas, illustrated as a receive antenna 954 and a transmit antenna 956. In addition, the communication subsystem 902 also includes a processing module, such as a digital signal processor (DSP) 958, and local oscillators (LOs) 960. The specific design and implementation of the communication subsystem 902 is dependent upon the communication network in which the mobile communication device 101A is intended to operate. For example, the communication subsystem 902 of the mobile communication device 101A may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 101A.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 101A may send and receive communication signals over the wireless carrier network 102A. Signals received from the wireless carrier network 102A by the receive antenna 954 are routed to the receiver 950, which provides for signal amplification, frequency down conversion, filtering, channel selection, etc., and may also provide analog to digital conversion. Analog-to-digital conversion of the received signal allows the DSP 958 to perform more complex communication functions, such as demodulation and decoding. In a similar manner, signals to be transmitted to the wireless carrier network 102A are processed (e.g., modulated and encoded) by the DSP 958 and are then provided to the transmitter 952 for digital to analog conversion, frequency up conversion, filtering, amplification and transmission to the wireless carrier network 102A (or networks) via the transmit antenna 956.

In addition to processing communication signals, the DSP 958 provides for control of the receiver 950 and the transmitter 952. For example, gains applied to communication signals in the receiver 950 and the transmitter 952 may be adaptively controlled through automatic gain control algorithms implemented in the DSP 958.

In a data communication mode, a received signal, such as a text message or web page download, is processed by the communication subsystem 902 and is input to the microprocessor 928. The received signal is then further processed by the microprocessor 928 for output to the display 926, or alternatively to some auxiliary I/O devices 906. A device user may also compose data items, such as e-mail messages, using the keyboard 924 and/or some other auxiliary I/O device 906, such as a touchpad, a rocker switch, a thumb-wheel, a trackball, a touchscreen, or some other type of input device. The composed data items may then be transmitted over the wireless carrier network 102A via the communication subsystem 902.

In a voice communication mode, overall operation of the device is substantially similar to the data communication mode, except that received signals are output to a speaker 910, and signals for transmission are generated by a microphone 912. Alternative voice or audio I/O subsystems, such as a voice message recording subsystem, may also be implemented on the mobile communication device 101A. In addition, the display 926 may also be utilized in voice communication mode, for example, to display the identity of a calling party, the duration of a voice call, or other voice call related information.

The short-range communications subsystem 904 enables communication between the mobile communication device 101A and other proximate systems or devices, which need not necessarily be similar devices. For example, the short-range communications subsystem may include an infrared device and associated circuits and components, or a Bluetooth™ communication module to provide for communication with similarly-enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of managing a plurality of electronic messages, the method comprising:
    receiving, at an electronic communication device, an electronic message and a session key, the electronic message encrypted with the session key, the session key being encrypted with an encryption passphrase;
    receiving a request to access the electronic message;
    receiving a candidate passphrase;
    arranging an attempt to decrypt the session key with the candidate passphrase;
    incrementing a count of failed decryption attempts responsive to determining that the attempt has resulted in a failure; and
    locking the electronic communication device in response to determining that the count of failed decryption attempts exceeds a limit, wherein the locked electronic communication device can be unlocked responsive to successful authentication of a device unlocking passphrase, the device unlocking passphrase being different from the encryption passphrase.

2. The method of claim 1, further comprising erasing the electronic message in response to determining that the count of failed decryption attempts exceeds the limit.

3. The method of claim 1, further comprising sending a notification to a sender of the electronic message in response to determining that the count of failed decryption attempts exceeds the limit, wherein the notification indicates that the encryption passphrase was not entered correctly.

4. The method of claim 1, further comprising:
    identifying a sender of the electronic message;
    identifying additional messages from the sender; and
    erasing the additional messages in response to determining that the count of failed decryption attempts exceeds the limit.

5. The method of claim 4, wherein the additional messages are stored locally on the electronic communication device.

6. The method of claim 1, further comprising:
    identifying additional messages related to the electronic message; and
    erasing the additional messages in response to determining that the count of failed decryption attempts exceeds the limit.

7. The method of claim 1, further comprising erasing the plurality of electronic messages in response to determining that the count of failed decryption attempts exceeds the limit.

8. The method of claim 1, further comprising prohibiting forwarding of the electronic message in response to determining that the count of failed decryption attempts exceeds the limit.

9. The method of claim 1, further comprising prohibiting replying to the electronic message in response to determining that the count of failed decryption attempts exceeds the limit.

10. The method of claim 1, further comprising disallowing copying of any portion of the electronic message in response to determining that of failed decryption attempts exceeds the limit.

11. The method of claim 1, further comprising disabling channels by which the electronic message may be copied from the electronic communication device in response to determining that the count of failed decryption attempts exceeds the limit.

12. The method of claim 1, further comprising, after locking the electronic communication device:
    receiving the device unlocking passphrase;
    successfully authenticating the device unlocking passphrase; and
    unlocking the electronic communication device responsive to successfully authenticating the device unlocking passphrase.

13. The method of claim 12, the method further comprising setting to zero the count of failed decryption attempts responsive to unlocking the electronic communication device.

14. The method of claim 1, wherein determining that the attempt has resulted in a failure comprises determining whether a result produced by the attempt has a predetermined format.

15. An electronic communication device comprising:
    a processor adapted to:
        receive an electronic message and a session key, the electronic message encrypted with the session key, the session key being encrypted with an encryption passphrase;
        receive a request to access the electronic message;
        receive a candidate passphrase;

arrange an attempt to decrypt the session key with the candidate passphrase;

increment a count of failed decryption attempts responsive to determining that the attempt has resulted in a failure; and lock the electronic communication device in response to determining that the count of failed decryption attempts exceeds a limit, wherein the locked electronic communication device can be unlocked responsive to successful authentication of a device unlocking passphrase, the device unlocking passphrase being different from the encryption passphrase.

16. The electronic communication device of claim 15, the processor further adapted to erase the electronic message in response to determining that the count of failed decryption attempts exceeds the limit.

17. A non-transitory computer-readable storage device containing computer-executable instructions that, when performed by a processor in an electronic communication device, cause the processor to:

receive an electronic message and a session key, the electronic message encrypted with the session key, the session key being encrypted with a passphrase;

receive a request to access the electronic message;

receive a candidate passphrase;

arrange an attempt to decrypt the session key with the candidate passphrase;

increment a count of failed decryption attempts responsive to determining that the attempt has resulted in a failure;

lock the electronic communication device in response to determining that the count of failed decryption attempts exceeds a limit, wherein the locked electronic communication device can be unlocked responsive to successful authentication of a device unlocking passphrase, the device unlocking passphrase being different from the encryption passphrase.

18. The non-transitory computer-readable storage device of claim 17, wherein the instructions, when performed by the processor, further cause the processor to erase the electronic message in response to determining that the count of failed decryption attempts exceeds the limit.

19. A method of managing a plurality of electronic messages, the method comprising:

receiving an electronic message, an electronic certificate and a session key, the electronic certificate encrypted with the session key, the session key being encrypted with an encryption passphrase;

receiving a request to access the electronic certificate;

receiving a candidate passphrase;

arranging an attempt to decrypt the session key with the candidate passphrase;

incrementing a count of failed decryption attempts responsive to determining that the attempt has resulted in a failure; and locking the electronic communication device in response to determining that the count of failed decryption attempts exceeds a limit, wherein the locked electronic communication device can be unlocked responsive to successful authentication of a device unlocking passphrase, the device unlocking passphrase being different from the encryption passphrase.

20. The method of claim 19, the method further comprising erasing the electronic message in response to determining that the count of failed decryption attempts exceeds the limit.

21. The method of claim 19, the method further comprising:

identifying additional messages related to the electronic message; and erasing the additional messages in response to determining that the count of failed decryption attempts exceeds the limit.

22. The method of claim 19, the method further comprising prohibiting forwarding of the electronic message in response to determining that the count of failed decryption attempts exceeds the limit.

23. The method of claim 19, the method further comprising prohibiting replying to the electronic message in response to determining that the count of failed decryption attempts exceeds the limit.

24. The method of claim 19, the method further comprising disallowing copying of any portion of the electronic message in response to determining the count of failed decryption attempts exceeds the limit.

25. The method of claim 19, the method further comprising disabling channels by which the electronic message may be copied from the electronic communication device in response to determining that the count of failed decryption attempts exceeds the limit.

* * * * *

UNITED STATES PATENT AND TRADEMARK OFFICE
CERTIFICATE OF CORRECTION

PATENT NO. : 9,112,732 B2  
APPLICATION NO. : 12/464279  
DATED : August 18, 2015  
INVENTOR(S) : Neil Patrick Adams et al.

It is certified that error appears in the above-identified patent and that said Letters Patent is hereby corrected as shown below:

In the claims

Column 12, Claim 10, should recite "The method of claim 1, further comprising disallowing copying of any portion of the electronic message in response to determining that the count of failed decryption attempts exceeds the limit."

Signed and Sealed this
Thirteenth Day of October, 2015

Michelle K. Lee
*Director of the United States Patent and Trademark Office*